United States Patent [19]

Krueger et al.

[11] Patent Number: 5,470,524
[45] Date of Patent: Nov. 28, 1995

[54] METHOD FOR MANUFACTURING A BLADE RING FOR DRUM-SHAPED ROTORS OF TURBOMACHINERY

[75] Inventors: Wolfgang Krueger, Reichertshausen; William Wei, Munich, both of Germany

[73] Assignee: MTU Motoren- Und Turbinen-Union Muenchen GmbH, Munich, Germany

[21] Appl. No.: 260,383

[22] Filed: Jun. 14, 1994

[30] Foreign Application Priority Data

Jun. 15, 1993 [DE] Germany .......................... 43 19 727.2

[51] Int. Cl.[6] ...................................................... B22F 7/04
[52] U.S. Cl. ............................... 419/5; 419/8; 419/10; 419/12; 419/14; 419/19; 419/48; 419/49
[58] Field of Search ............................. 419/5, 8, 10, 12, 419/14, 19, 48, 49; 428/548, 551, 552

[56] References Cited

U.S. PATENT DOCUMENTS

| | | | |
|---|---|---|---|
| 4,338,132 | 7/1982 | Okamoto et al. ............... 75/208 R |
| 4,673,549 | 7/1987 | Ecer ............................... 419/10 |
| 4,797,155 | 1/1989 | Das ................................ 75/229 |
| 5,030,277 | 7/1991 | Eylon et al. ................... 75/229 |
| 5,326,525 | 7/1994 | Ghosh ........................... 419/23 |

*Primary Examiner*—Donald P. Walsh
*Assistant Examiner*—Scott T. Bluni
*Attorney, Agent, or Firm*—Evenson, McKeown, Edwards & Lenahan

[57] ABSTRACT

A method is provided for manufacturing a bladed ring for drum-shaped rotors of turbomachinery, especially rotors for axial compressors of gas turbine engines. The bladed ring is to be manufactured by hot isostatic pressing (HIP) and the fiber rings are formed in a metallic powder material for the bladed ring arranged in a circumferential direction. The fiber rings are bonded with spacing therebetween. The fiber rings are reinforced by fibers embedded in a metal matrix. The bladed ring prefabricated in this fashion by HIP is machined down to its required dimensions.

15 Claims, 3 Drawing Sheets

METHOD FOR MANUFACTURING A BLADE RING FOR DRUM-SHAPED ROTORS OF TURBOMACHINERY

BACKGROUND AND SUMMARY OF THE INVENTION

The invention relates to a method for manufacturing a bladed ring for drum-shaped rotors of turbomachinery, especially rotors for axial compressors of gas turbine engines.

A compressor rotor for gas turbine engines is known from German Patent document DE-PS 31 01 250, in which the drum-shaped rotor is assembled from ring elements partly constructed using a stiffening box design. The ring elements are supported against one another at their end faces via center tabs turned toward one another. The tabs engage recesses distributed around the circumference of the ring elements between the blade roots of a rotor blade grid. The rotor blades radially abut both ends of the ring element with hammer-head-shaped root ends. Segments of the ring elements abutting the respective roots of the rotor blades at both ends are designed to serve as supports for reinforcing rings that are fiber-reinforced and extend over the circumference. The following, among other things, are viewed as disadvantageous in this known rotor design:

There is no positive or non-positive material-wise and absolutely firm fiber ring anchoring. Thermal as well as circumferential and radial stresses can lead to undesirable relative movements and loosening of the fiber rings, especially with regard to frequent, non-steady-state, operating conditions, i.e. other fluctuations in load and rotational speed.

There is a design-dictated arrangement for the fiber rings, so that an arrangement of the fiber rings which is individually adjusted to the respective circumferential and radial mass loads that are greatest is not possible.

There is a specific, solid, and heavy blade design.

Replacing a blade, i.e., such as due to damage, requires loosening the ring or drum bond.

The fiber ring is accessible from the outside, and therefore directly exposed to the flow and corresponding temperatures. The ring is thus endangered both by erosion and by foreign particles.

There is formed a bond that is critical in terms of strength, as the consequence of an overlapping loose supporting connection via narrow tongues between the axial root recesses.

There are manufacturing difficulties. The fiber rings must be inserted or shrunk into circumferential grooves while attempting to maintain their self-contained design and structure strength.

There is therefore needed a method for manufacturing a bladed ring by which a lightweight blade ring for a drum-shaped rotor can be produced in a relatively simple fashion with locally directed control of circumferential and radial loads that appear. The manufacturing must be done in such manner that there are no fluidic (high-pressure air/hot gas) or mechanical adverse effects on the fiber rings used.

The present invention meets these needs by providing a method for manufacturing a bladed ring for drum-shaped rotors of turbomachinery, especially rotors for axial compressors of gas turbine engines. The method makes use of the following steps:

Embedding wound rings, made of fibers bonded in a metal matrix, in metal powder;

Performing hot isostatic pressing (HIP) of the system according to the above step; and Finishing the prefabricated ring blanks to their final dimensions.

Without being tied to a heavy wheel disk design that is expensive to manufacture, a comparatively lightweight rotor design using the drum structure can be produced. In this design, the bladed rings can be welded directly to one another, or by means of intermediate rings or locally by means of ring elements that taper to "shaft stubs," e.g. by frictional or electron beam (EB) welding. The bladed rings, within the scope of the rotational speed and stress due to centrifugal force (circumferential and radial stress), are locally reinforced by the fiber rings. The fiber rings are arranged with their fibers mainly extending in a direction over the circumference. Available as prefabricated "semi-finished products", the fiber rings, in the course of the manufacturing process, are bonded in an absolutely permanent and operationally stable fashion by the hot isostatic pressing process (HIP) into the metal material of the bladed ring. In view of the pressures and temperatures used in HIP, the fiber rings, as far as their metal matrix is concerned, can be permanently connected with the metal material of a bladed ring, supplied in powder form to the HIP, for example, to a metal capsule, by surface diffusion (diffusion welding). The bladed ring blank, which after the HIP process still has excess material with respect to its finished size, can be finished by machining, for example, by turning and/or grinding, to its finished size without damaging the fiber rings.

Within the scope of the present invention, "preliminary manufacture" integral with the ring is possible. In addition, for example, outer root stub prefabrication of depressions, both as to the surface and integral with the ring, extending over the circumference is possible. The depressions are intended to form, in the course of subsequent finishing, axial grooves for the roots of rotor blades that are to be mounted later. With a ring surface completely machined to the required size and root stubs that are completely finished, the blade profiles or blades can be permanently connected by welding, e.g. linear frictional welding, with the respective ring surface or the root stubs.

Another advantage of the method according to the present invention is that the fiber rings are not directly exposed to the process fluid (compressor air, gas, hot gas) so that they are not subjected to any direct fluidic temperature influence or any chemical influence (corrosion) or abrasion, such as by particles in the fluid.

Especially within the framework of the diffusion bonding that is possible with hot isostatic pressing, the same metallic materials, or at least chemically-physically similar material pairs, are provided for the metal powder material of the bladed ring, and also for the metallic matrix of the fiber rings or for the outer metal fiber core coating.

Other objects, advantages and novel features of the present invention will become apparent from the following detailed description of the invention when considered in conjunction with the accompanying drawings.

DETAILED DESCRIPTION OF THE DRAWINGS

Figure 1:
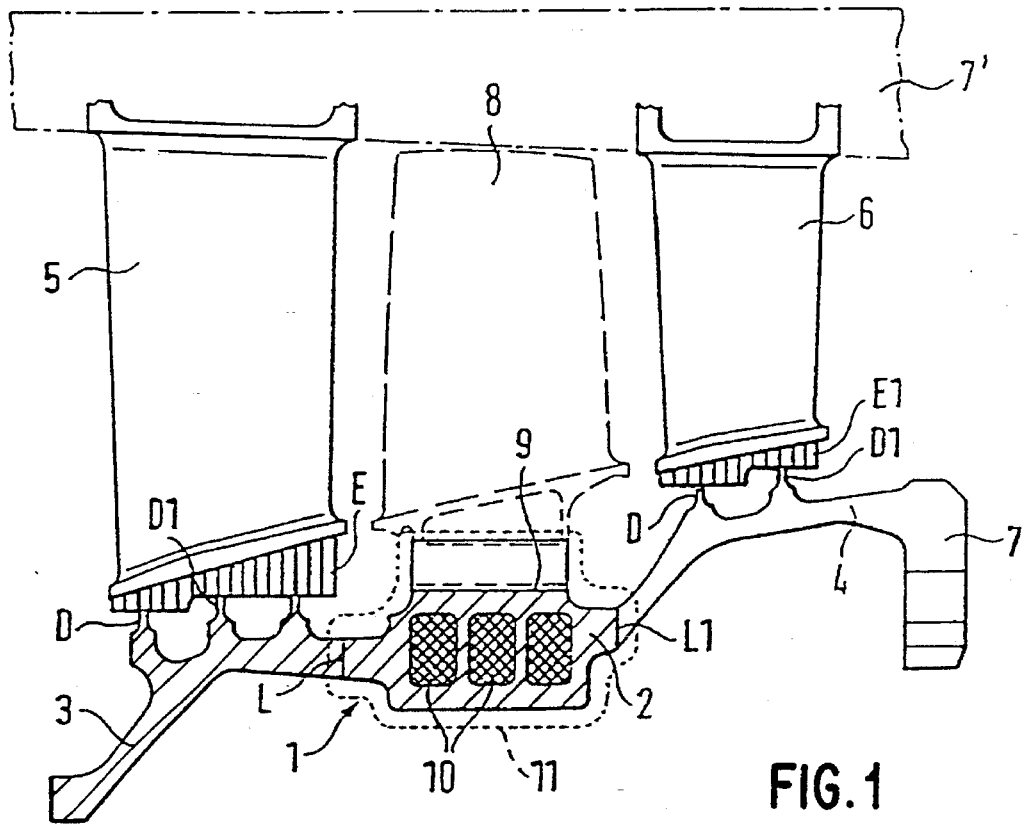
FIG. 1 is an axially parallel cross-section of a first embodiment of a design of the bladed ring with axial grooves for releasable rotor blades, the bladed ring being manufactured according to the present invention as a rotor-drum section of an axial compressor with intermediate rings forming sealing rings, as well as guide and rotor blades in the compressor channel.

Referring to the figures, in a drum-shaped rotor section 1 for an axial compressor of a gas turbine engine, reference numeral 2 refers to a bladed ring manufactured according to the present invention. After completion, the bladed ring 2 is welded at its outer circumferential edges along lines L, L1 with corresponding circumferential edges of intermediate rings 3, 4, having sealing lips D, D1. The lips D, D1 project radially so that they extend over the circumference. Intermediate rings 3, 4 form labyrinth seals with respect to inlet coatings E, E1 provided on the radial inner end of the respective guide blades. The inlet coatings E, E1 are staggered locally. Intermediate ring 4 has a flange 7 on the right side, by which it can be bolted, for example, with another compressor rotor section or with the turbine shaft driving the compressor. Guide blades 5, 6 are permanently anchored radially outward by their roots to the compressor housing 7'. The finished bladed ring 2 is provided with removable rotor blades 8, held radially inward by their roots, for example, with dovetail-shaped roots, in correspondingly shaped axial grooves 9 distributed over the outer circumference of the bladed ring 2.

The bladed ring 2 has fiber rings 10 permanently bonded coaxially to the compressor axis in the metallic material for the blade ring, by which rings the bladed ring 2 is reinforced mainly as regards circumferential and radial forces. The fiber rings 10 have their centers in a common ring plane. The fiber rings 10 have fibers embedded in a metal matrix, with the cross-hatched areas showing individual fiber layers in the matrix with the fiber orientation being mainly in the direction of the circumference of the ring. The bladed ring 2 is made by hot isostatic pressing (HIP) whereby metal powder added to a given ring capsule 11 (see also FIGS. 3 and 4) makes a permanent and positive connection with the metallic matrix material of the fibers, especially through surface diffusion.

It is assumed in this process that the fiber rings 10 are available as "semi-finished products" which are ready for the manufacturing process.

With reference to FIG. 1, ring capsule 11 is dimensioned and preshaped so that simultaneously, in the HIP process, axial grooves 9 are roughly prefabricated leaving disk elevations. It is also evident from FIG. 1 that the entire ring capsule has a shape that is larger in terms of volume and is more roughly structured than the finished bladed ring 2 that is shown. This is due to the contraction of the material that takes place during HIP (process) and certain fluctuations in shape which, in other words, necessitate a certain oversizing of the finished ring blank before it is machined to the necessary dimensions shown.

Figure 2:
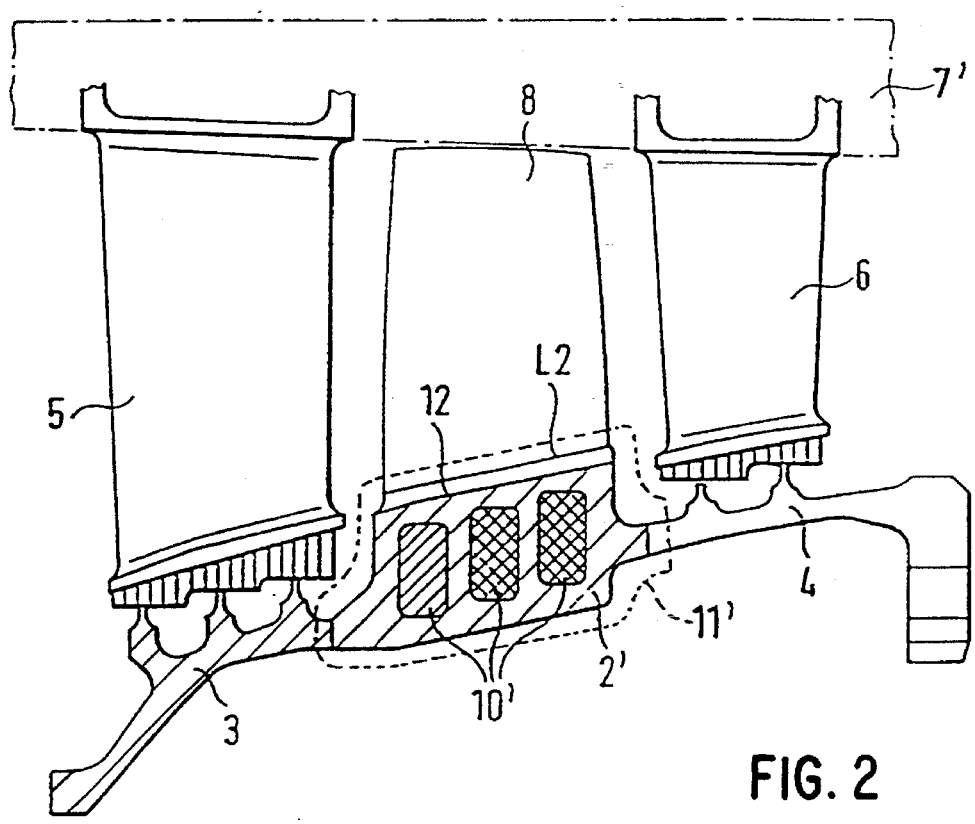
FIG. 2 illustrates another bladed ring manufactured according to the present invention in an end view, as well as the basic design of the rotor drum section according to FIG. 1, but here with an arrangement, staggered with respect to one another in different coaxial annular planes, of the fiber rings as well as a welded connection of the rotor blades rootwise to prefabricated bases on the bladed ring.

Using the same reference numerals for components and functions that are the same or essentially the same as in FIG. 1, FIG. 2 embodies a finished version of the blade ring 2', manufactured according to the method of the invention. The bladed ring 2' has a slanted arrangement of the inner and outer walls that is uniform relative to the lengthwise axis of the compressor. During manufacture by HIP, the respective fiber rings 10' are offset with respect to one another in ring planes that are staggered relative to the compressor's lengthwise axis and bonded permanently in the metallic material in bladed ring 2'. Ring capsule 11' is preshaped to suit the slanted arrangement of the finished blade ring 2', and preshaped in the radial outer circumferential area in such fashion that axial root bases 12, uniformly distributed around the circumference, are roughly finished at the same time during manufacture and are later finished to the necessary final dimensions and the necessary shapes. This is so that finished rotor blades 8 with their final shapes at their roots can be welded flush with the finished root bases 12 along line L2.

Figure 5:
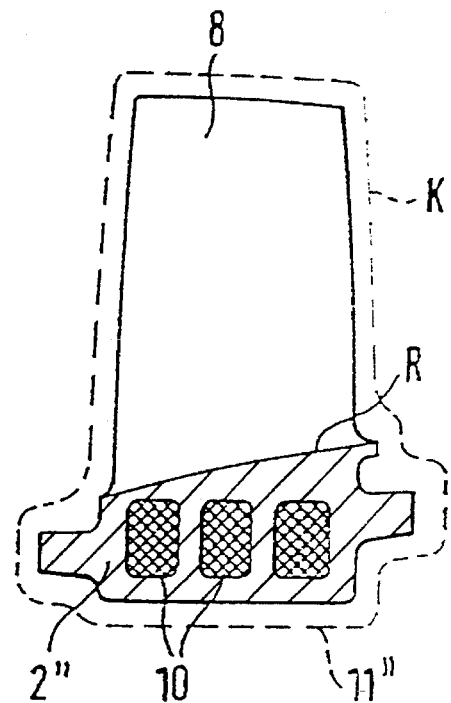
FIG. 5 shows only a single bladed ring in a corresponding section and arrangement relative to the drum-shaped rotor section shown in FIGS. 1 and 2, illustrating prefabrication of the rotor blades in which the material is integral with the bladed ring.

Usable for the drum rotor concept according to FIGS. 1 or 2, FIG. 5 embodies a variation of a bladed ring 2" manufactured according to the present invention. The bladed ring 2" has an arrangement of fiber rings 10 as in FIG. 1, and is finished. The rotor blades 8 are integrally manufactured components of the bladed ring 2". For this purpose, ring capsule 11" can be prefabricated with simultaneous prefabrication of a shaped section (capsule contour K) that abuts the outside of the ring around the circumference. This shaped section, after the HIP process, can be machined into individual rotor blades 8 distributed around the outer circumference R of the ring (as shown) in one or more steps.

Figure 6:
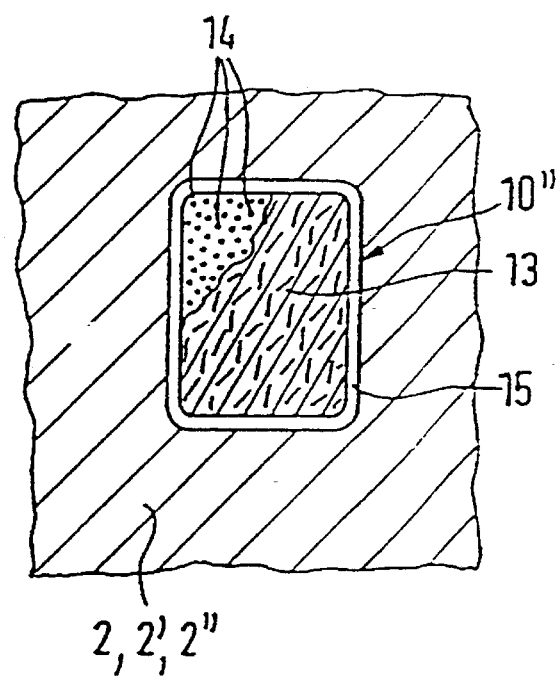
FIG. 6 is an axially parallel sectioned view of a bladed ring portion with provision for one of several fiber rings, here shown with a metallic jacketing of a fiber core applied externally in layers.

FIG. 6 shows the use of several fiber rings 10" which can be used in the HIP process for manufacturing the bladed ring 2 (FIG. 1) or 2' (FIG. 2) or 2" (FIG. 5). The fiber rings 10" are produced from a core 13 with fibers 14 extending in the circumferential direction of the blade or fiber ring and permanently bonded in a metal matrix. Core 13 must be completely provided with at least one firmly adhering metal surface layer 15. This surface layer 15 can be diffusion-bonded with the metal material for the bladed ring by hot isostatic pressing (HIP) in the manufacture of the bladed ring. During the manufacture of the fiber rings, fibers 14 can be individually metallically coated at the outset. The individual metal layers of fibers 14 can be diffusion-welded into a common fiber matrix by a subsequent HIP process.

Figure 3:
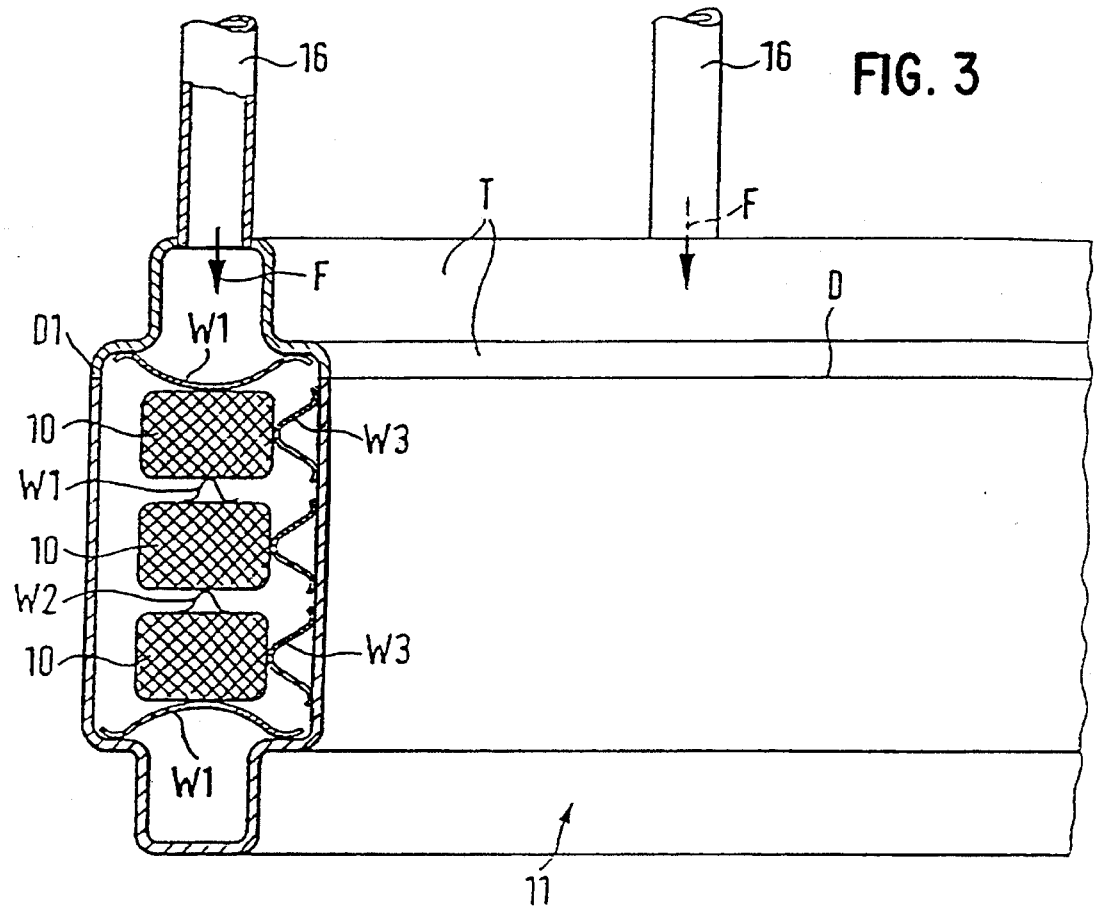
FIG. 3 shows a first fiber ring mount that can be used for the manufacturing process on a hermetically sealable ring capsule for the HIP process, shown partially cut away and with a complete ring cross section.
Figure 4:
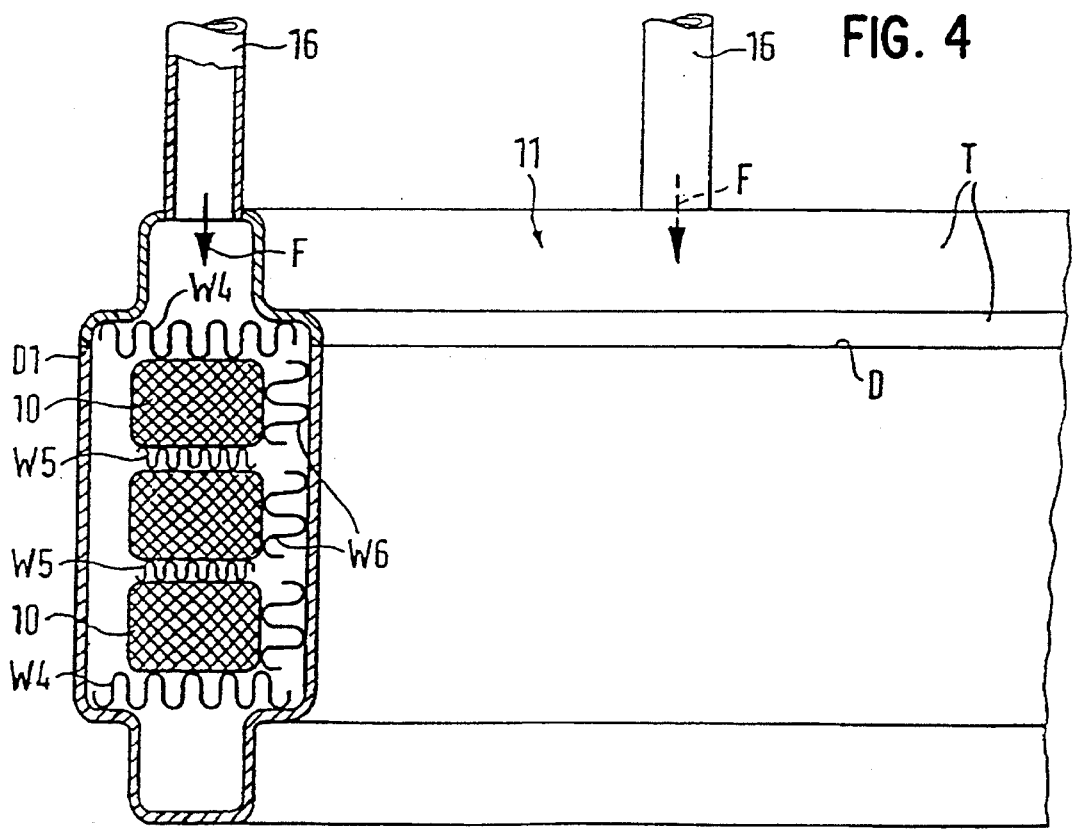
FIG. 4 is an end view of a second fiber ring mount that can be used for the manufacturing method, as well as a section of the ring capsule according to FIG. 3.

In combination with a bladed ring to be manufactured, e.g., bladed ring 2 according to FIG. 1, an advantageous design process for the invention is characterizable as follows:

The fiber reinforced rings 10 are arranged in the ring capsule 11 with a spacing with respect to the capsule, and a spacing that is mutually powder-permeable and elastic. The ring capsule 11, including the spaces left between rings 10, is filled by means of a metal powder. The filling direction F is through tubes 16 (FIG. 3 and 4). The powder filling openings in the ring capsule are hermetically sealed, for example, by pinching the tube cross sections. The HIP process is performed through ring capsule 11, with the rings 10 being permanently bonded in the metallic material of the blade ring. The ring capsule 11 is then removed. The bladed ring blank is finally machined.

From FIGS. 3 and 4, spacer holders for the fiber rings 10 used for performing the method are used. The spacer holders allow the fiber rings 10 to be anchored before powder-filling F in an operationally reliable and non-removable fashion in capsule 12 with the required mutual spacing and also with regard to the spacing from the inside wall of the capsule.

A powder-permeable elastic membrane-like corrugated body W1, W2, W3 made of fine wire mesh is used in order to ensure a uniform distribution of the metal powder on all sides, despite the desired supporting effect and mounts for the fiber rings 10 in the capsule 11.

FIG. 4, in contrast to FIG. 3, embodies a somewhat more dimensionally stable mounting and support for the fiber rings 10 in the capsule 11. In FIG. 4, basically corrugated bodies W4, WS, W6 each have a large number of successive corrugations. As is also evident from FIGS. 3 and 4, capsule 11 has a releasable part T which, along opposite abutting edges D, D1 on the circumference of the ring, is placed tightly against the volume-wise larger remaining part of the capsule 11 when the fiber rings 10 have already been inserted with the appropriate spacing. When the removable part T is installed, the relative mutual elastic placement of the fiber rings 10 takes place at the same time.

Hot isostatic pressing (HIP) takes place with suitable heat treatment in a furnace, with the capsule in question, 11 for example, being exposed to a suitable pressure that is uniform on all sides. By using titanium or titanium-based alloy as the metal powder, the HIP process can be performed at a temperature of about 950° C. to 1,000° C. and at a pressure between 1,000 and 2,000 bar.

For a compressor rotor, for example, both the powder material used to make the bladed ring and the matrix material for the fibers of the fiber rings can be made of a titanium-based alloy or a titanium-based alloy including intermetallic phases (e.g. TiA1, $Ti_3Al$). With a titanium-based alloy, the fibers can be made, for example, of B, $B_4C$ or SiC. In a titanium-based alloy including intermetallic phases, the fibers can be made of SiC or $Al_2O_3$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for manufacturing a blade ring on a rotor, having a rotor axis, of a turbo-engine, the method comprising the steps of:

firmly bonding fiber rings into a metallic material of the blade ring for absorbing stresses caused by the rotational speed and the centrifugal force of the turbo-engine, said fiber rings being arranged coaxially with respect to the rotor axis, the fiber rings being present as finished products, in which case fibers of said fiber rings are firmly bonded into a metal matrix to form said fiber rings;

manufacturing the blade ring of a metal powder as said metallic material using hot isostatic pressing (HIP);

diffusion bonding a metallic material partner of the metal matrix and of the metal powder for the blade ring during said hot isostatic pressing;

using a ring capsule, coordinated with a basic shape of the blade ring, for performing the HIP-process;

arranging the fiber rings in said ring capsule at a mutual distance and surrounded on all sides by the metal powder filled into the ring capsule; and finishing the blade ring blank produced by the HIP-process to a specified size.

2. A method according to claim 1, further comprising the steps of:

hermetically sealing said filled ring capsule prior to performing said HIP process;

removing said ring capsule; and performing final machining of said bladed ring blank.

3. A method according to claim 2, wherein said ring capsule is preshaped, and further comprising the step of shaping one of axial and circumferential grooves in said ring capsule, said grooves being finished during said finishing step so as to match with a blade root of said bladed ring.

4. A method according to claim 2, wherein said ring capsule is preshaped during the formation of one of a common outer ring surface to be premanufactured by HIP and several axial root stubs of said bladed ring blank uniformly distributed over a circumference of said bladed ring blank, said one outer ring surface or said root stubs being finished after HIP, after which rotor blades are connected with the ring surface or the stubs by linear frictional welding.

5. A method according to claim 2, wherein said ring capsule is preshaped with an enlarged shaped section which abuts said bladed ring jointly with one side around a circumference of said bladed ring, said shaped section, after HIP, being finished into individual rotor blades uniformly distributed around the circumference in one or more steps.

6. A method according to claim 1, wherein said fibers of said fiber rings embedded in a metal matrix are arranged to extend in a circumferential direction of the bladed ring.

7. A method according to claim 1, wherein for surface diffusion in the HIP process, substantially similar metallic materials are used for the matrix of the fiber rings and for the powder material of the bladed ring.

8. A method according to claim 1, wherein in order to manufacture said bladed ring, said fiber rings have fibers which are initially metallically coated and, wherein by an HIP process, the individual metal coatings of the fibers are diffusion-welded into a common fiber matrix.

9. A method according to claim 1, wherein the fiber rings of said bladed ring are made from a core, with fibers extending in a circumferential direction of the bladed ring and permanently bonded with a metal matrix, and wherein said core is provided wholly with a permanently adhering metallic surface coating, which in the HIP process used for bladed ring manufacturing, is diffusion-welded with the powder material of the bladed ring.

10. A method according to claim 1, wherein the fiber rings with their respective ring centers are non-rotationally bonded in the bladed ring, in a ring plane that is concentric with respect to the rotational axis.

11. A method according to claim 1, wherein a titanium-based alloy is used for the powder material of at least one of the bladed ring and the metal matrix of the fiber rings.

12. A method according to claim 1, wherein several bladed rings are directly welded together to form a rotor drum.

13. A method according to claim 1, wherein several bladed rings are welded together using intermediate rings.

14. A method according to claim 11, wherein said titanium-based alloy includes intermetallic phases.

15. A method according to claim 1, in which the HIP-process is carried out comprising the steps of:

arranging the ring capsule in a furnace with an adapted pressure and temperature treatment; and subjecting the ring capsule to a pressure which is uniform on all sides of the ring capsule.

* * * * *